April 18, 1967     B. LE ROY GODBERSEN     3,314,485

DISC LIFT HARROW

Filed June 14, 1965                              2 Sheets-Sheet 1

INVENTOR
BYRON L. GODBERSEN
BY
Robert L. Anderson
ATTORNEY

April 18, 1967   B. LE ROY GODBERSEN   3,314,485
DISC LIFT HARROW
Filed June 14, 1965   2 Sheets-Sheet 2
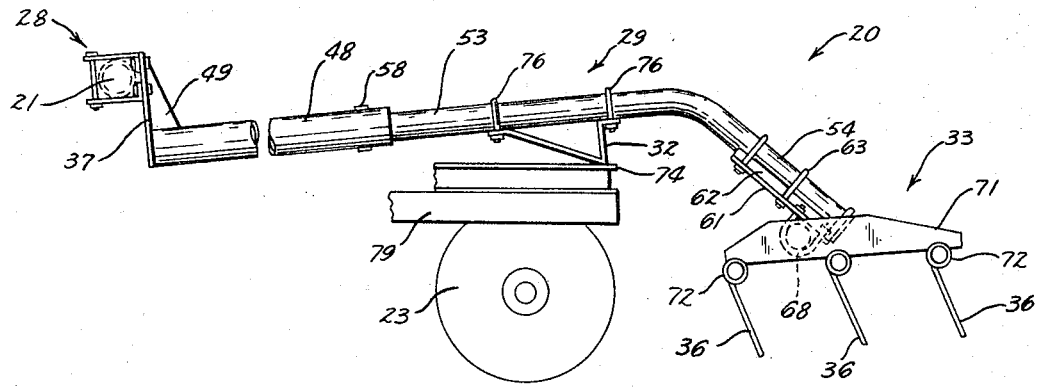
Fig. 4
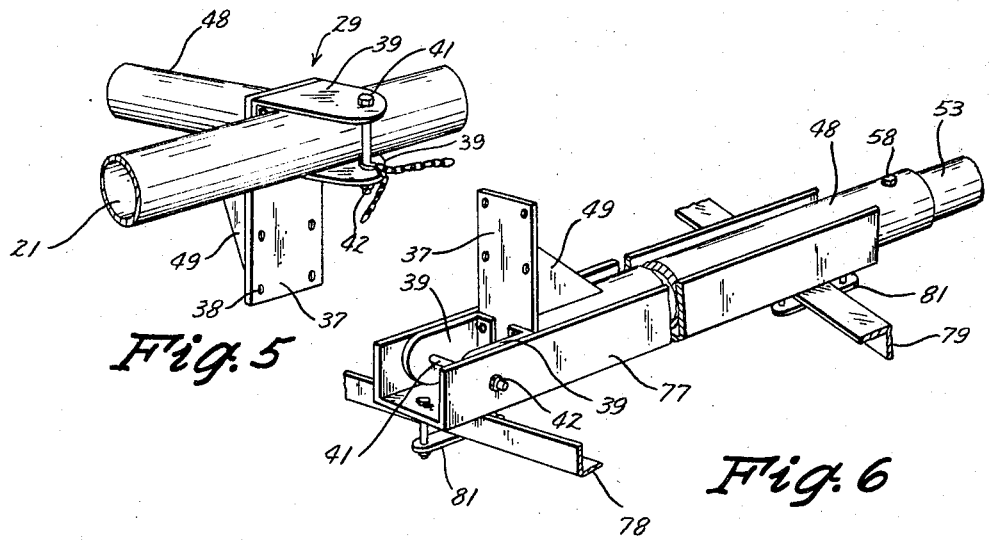
Fig. 5
Fig. 6
INVENTOR
BYRON L. GODBERSEN
BY
Robert Henderson
ATTORNEY

United States Patent Office 3,314,485
Patented Apr. 18, 1967

3,314,485
DISC LIFT HARROW
Byron Le Roy Godbersen, Ida Grove, Iowa 51445
Filed June 14, 1965, Ser. No. 463,571
1 Claim. (Cl. 172—178)

This invention relates generally to a disc harrow, and particularly to a universal tooth-type harrow adjustably attachable to any conventional disc harrow of the wheel type or of the full mounted type.

It is an object of this invention to provide an improved tooth harrow constructed to be attached to any conventional disc harrow without the necessity of different attachments for each disc harrow.

Yet another object of this invention is the provision of a tooth harrow readily and adjustably attachable to the transport pipe of a disc harrow, with the tooth harrow extended rearwardly over and resting upon the disc harrow, the teeth of the tooth harrow selectively poised over for working the soil upon operation of the disc harrow.

Still another object of this invention is to provide a tooth harrow attachable to the transport pipe of any conventional disc harrow at any laterally spaced position thereon, attachable thereto at vertically adjusted locations, extensible rearwardly of the transport pipe so as to adjust the reach of the tooth harrow, adjustably engageable with the disc harrow rearwardly of the transport pipe for vertically adjusting the transport height of the tooth harrow, and having a tooth carrying frame rockable about a horizontal axis.

Another object of this invention is the provision of a tooth harrow as characterized hereinbefore, and having teeth held firmly in a soil-working position when traveling forward, and swingably rearwardly out of the soil-working position in response to reverse, rearward movement of the disc harrow.

It is another object of this invention to provide a tooth harrow for universal mounting on any conventional wheel or full mounted disc harrow, capable of attaining the above designated objectives and which is economical to manufacture, rugged in construction, and effective in operation.

These objects and other features and advantages of this invention will be readily apparent from reference to the following description and accompanying illustrations, wherein:

FIG. 4 is a side elevational view, wherein the carrying height of the tooth harrow is varied from that of FIG. 2;

FIG. 5 is an enlarged, fragmentary perspective view of the tooth harrow mounting element for use with wheel-type disc harrows; and FIG. 6 is an enlarged, fragmentary perspective view of an alternate mounting element to be used on full mounted disc harrows.

Figure 1:
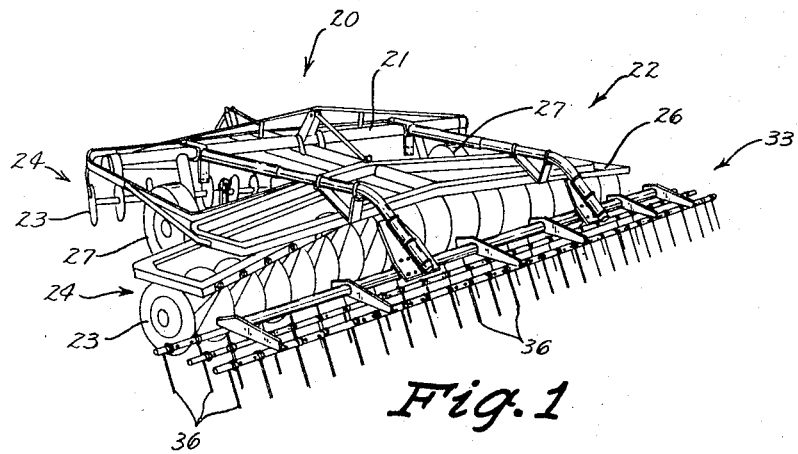
FIG. 1 is a perspective view of the tooth harrow of this invention shown mounted on a disc harrow of the wheel type.

Referring now to the drawings, the spring tooth harrow of this invention, indicated generally at 20 in FIG. 1, is connected to the transversely extended transport pipe 21 of a wheel type disc harrow 22. The disc herein illustrated has a plurality of blades 23 mounted in gangs 24 which are bolted to the disc frame 26. Wheels 27 are mounted to the frame 26 and can be either manually or hydraulically lowered for transporting the disc to the field, and are adjustable while discing to raise the disc for crossing ditches, waterways or other obstructions.

The tooth harrow 20 (FIG. 2) of this invention comprises generally a pair of mounting units 28, adjustably attached in transversely spaced relation to the pipe 21, a pair of reach assemblies 29 each secured at one end to a respective mounting unit 28 and extended rearwardly therefrom in substantially parallel relationship, and a frame assembly 33 connected to and extended between the rear ends of the reach assemblies 29 with the frame assembly 33 including a plurality of soil-engageable spring teeth 36 connected thereto. As the mounting units 28 and reach assemblies 29 are identical, only one interconnected pair will be described, with like parts indicated by like reference numerals.

The mounting unit 28 (FIG. 3) comprises a rectangular plate 37 with a plurality of holes 38 formed therein, two L-shaped clamps 39, a machine bolt 41 and lock nut 42, and a set of four smaller bolts 43 with accompanying lock nuts 44. Each clamp 39 has a rectangular shaped base 45 with two holes 46 formed therein, and an upper portion rounded at the free end with a hole 47 formed in the center thereof. The clamps 39 are fastened one above the other to the transport pipe 21 with the bases 45 facing each other and in a vertical plane.

Figure 2:
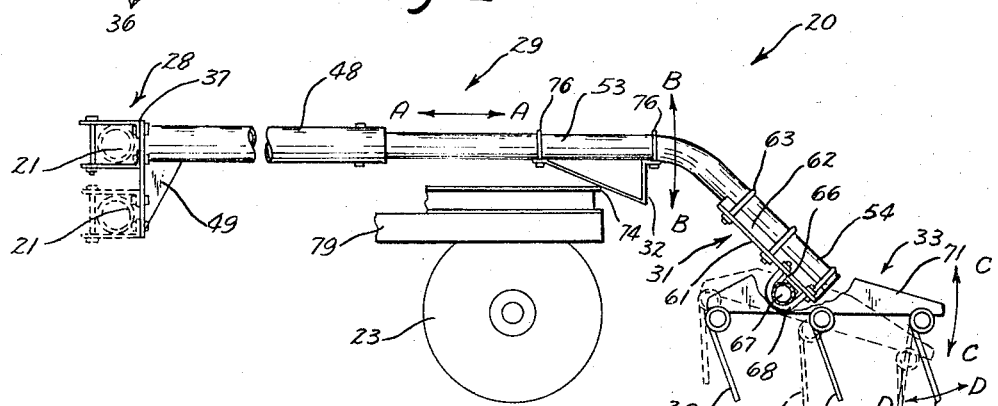
FIG. 2 is an enlarged, side elevational view of the tooth harrow, alternate positions of certain parts shown by the use of dotted lines.
Figure 3:
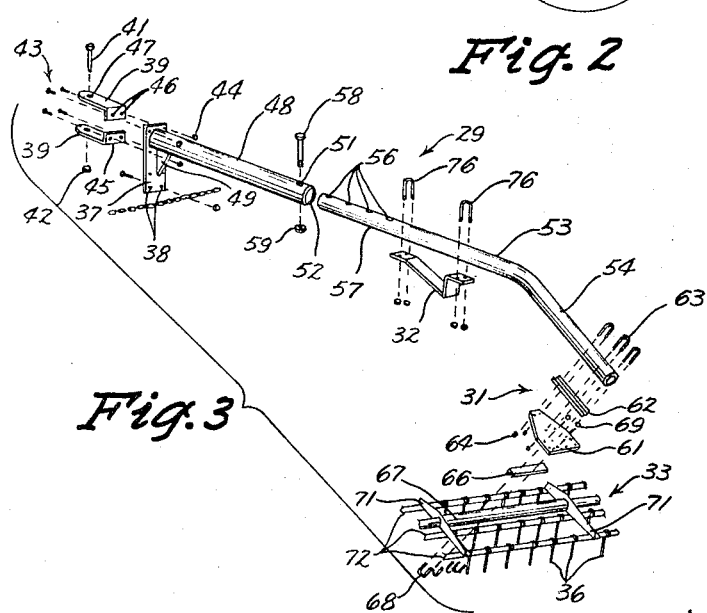
FIG. 3 is a perspective, exploded view of the tooth harrow.

It will be noted in FIG. 3 that the plate 37 has a quartet of vertically spaced pairs of holes 38, and that the two pairs of holes 46 in bases 45 are horizontally alignable with any two adjacent pairs of the holes 38. Thus, the plate 37 can be attached to the bases 45 at its top as shown in full lines in FIG. 2. Or if the transport pipe 21 is in a lower position as shown in dotted lines in FIG. 2, the plate 37 can be attached to the bases 45 at its bottom by the two pairs of holes 38. Referring to FIG. 4, the plate is shown in an inverted position relative to the bases 45. It can readily be seen that the plate 37 and the bases 45 can be vertically adjustably connected together in a number of positions to best accommodate the attachment of the tooth harrow 20 to the particular disc harrow 22 being used therewith.

The reach assembly 29 (FIGS. 2 and 3) includes a horizontally disposed tubular sleeve 48 secured to one end of the plate 37 and extended at right angles therefrom. To provide rigidity and bracing, a triangular shaped member 49 is welded perpendicularly to the plate 37 and axially along the sleeve 48. A hole 51 (FIG. 3) is formed radially through the open end 52 of the sleeve 48.

The reach assembly 29 (FIG. 2) also comprises a tubular arm 53 which has a smaller diameter than the sleeve 48 to allow telescopic insertion therein. End 54 (FIG. 3) of the arm 53 is disposed downwardly at approximately 30° for approximately one-third of the length of arm 53. A plurality of longitudinally spaced holes 56 are formed radially through the other end 57 of the arm 53. The arm 53 is telescopically adjustable relative to the sleeve 48 so as to vary the length of each reach assembly 29, and is releasably connected thereto by a bolt 58 and nut 59 secured through the hole 51 and any one of the holes 56 aligned therewith.

Mounted on end 54 of the arm 53 (FIG. 2) is a bracket assembly 31 comprising a generally hexagonal shaped, flat plate 61 (FIG. 3) with a plurality of holes formed therein, and an elongated U-shaped tube clamp 62. The tube clamp 62 is positioned axially along the bottom of the arm 53 whereby the arm nests therein, and with the flat bottom of the clamp 62 against the plate 61 (see FIG. 2). Securing the plate 61 to the arm 53 are three U-bolts 63 assembled over the arm 53, on both sides of the clamp 62, through holes provided therefor in the plate 61, and which bolts 63 are locked with lock nuts 64.

A second tube clamp 66 (FIG. 3) is positioned to the underside of the plate 61 with its base in communication therewith and the open side nested against a portion of an elongated tubular frame bar 67 and secured thereto by a second set of U-bolts 68 positioned over the bar 67, around the clamp 66 and through holes provided in the plate 61, where a second set of lock nuts 69 are provided to lock the bar 67 to the plate 61.

The frame assembly 33 (FIGS. 1 and 3) includes the transversely extended frame bar 67, and a plurality of transversely spaced frame elements 71 extended fore and aft of the frame bar to which they are secured. Mounted on the flat underside of the elements 71 are a trio of elongated tooth bars 72, secured in parallel, longitudinal spaced relation relative to the elements 71.

Each tooth bar 72 has swingably secured thereto a plurality of spring teeth 36 operable as shown in FIG. 4 to assume a normal, soil-working position relative to the frame elements 71. However, upon movement of the disc harrow 22 to the rear, the teeth 36 are rotatable in a clockwise direction as viewed in FIG. 4, and thereby assume a trailing position so as not to brake the rearward motion of the harrows 20 and 22.

To adjust the carrying height of the frame assembly 33, a triangular shaped ramp member 32 (FIG. 3) is secured to the underside of each reach arm 53 as best illustrated in FIG. 4. The underside of the ramps engage a portion 74 of the disc harrow 22. A pair of U-bolts 76 provide the securement, and also enable each ramp 32 to be moved longitudinally of its respective arm 53. Thus, as shown in FIG. 2, a ramp 32 is positioned rearwardly of its position of FIG. 4, with the latter position spacing the reach assemblies 29 higher above the disc harrow portion 74, thus raising the frame assembly 33 from its position of FIG. 2.

For mounting the tooth harrow 20 on a full mounted disc (not shown), an attachment 77 (FIG. 6) is provided which comprises a U-shaped channel member with a pair of transversely aligned holes formed through the walls at one end thereof. A pair of longitudinally spaced holes are also formed in the base of the member 77 at each end thereof. The member 77 is axially secured to the bottom of sleeve 48, by fastening the clamps 39 to the plate 37 at right angles to their normal position as shown in FIG. 5 and securing the member 74 (FIG. 6) by the bolt 41 and nut 42. The attachment 73 is secured to the frame of the full mounted disc by use of brackets 81, positioned under frame pieces 78 and 79 and bolted through to the member 77 as illustrated.

In summation, a tooth harrow has been described hereinbefore which is readily attachable to substantially any disc harrow of a wheel type or of a full mounted type, thereby making the present tooth harrow substantially a universal structure useable on any conventional implement of this nature. It is seen that the mounting structure 28 therefor is adaptable to any number of positions so as to be engageable with transport pipes of a variety of positions. As indicated by the arrows A—A in FIG. 2, the longitudinal length of the tooth harrow is variable. Furthermore, as indicated by the arrows B—B in FIG. 2, the vertical spacing of the reach assemblies 29 above the framework of the disc harrow 22 is adjustable by means of the ramps 32. Further in addition, as indicated by the arrows C—C and D—D in FIG. 2, both the frame assembly 33 and the spring teeth 36 are swingably mounted relative to each other and relative to the outer ends of the reach assemblies 29.

Although a preferred embodiment of this invention has been described hereinbefore, it is to be remembered that various modifications and alternate constructions can be made thereto without departing from the true spirit and scope of the invention as defined in the appended claim.

I claim:

The combination with a disc harrow including a frame having a forward end and a rearward end, a pair of transporting wheels positioned transversely of said frame between the forward and rearward ends thereof and normally spaced above a ground surface, a wheel carrying element connecting said wheels together, means rotatably connecting said element to said frame about a transverse, horizontal axis for pivotal movement of said wheels from the normal position to a position in which said wheels are in a transporting position on said ground surface, means operatively connected to said element effecting movement of said wheels from the normal position to the transporting position of a tooth drag attachment comprising:

at least a pair of reach arms disposed over the frame and the harrow and having forward ends adjacent the element and rear ends disposed rearwardly of the harrow;

mounting means attachable to said forward ends and to the element for adjustably mounting said reach arms forward ends to the element in vertically adjustable relation thereto, said mounting means rotatable with the element;

ramp means secured to said reach arms intermediate the ends thereof and engageable with the harrow, said ramp means movable longitudinally of said reach arms whereby said reach arms are pivotally adjustable at their forward ends about the element;

an elongated member rotatably secured to the reach arm rear ends and disposed normally parallel to the element and rotatably adjustable to one of a plurality of rotating positions; and a tooth unit secured to said member, said unit including at least a pair of bars extended parallel to said member on either side thereof, and carrying a plurality of teeth arranged in spaced relation therealong and depending therefrom, said tooth unit movable with said elongated member to one of a plurality of positions where said teeth are inclined relative to the ground.

References Cited by the Examiner

UNITED STATES PATENTS

| 328,898 | 10/1885 | Lyons | 172—140 |
|---|---|---|---|
| 1,412,124 | 4/1922 | Long | 172—618 |
| 2,960,169 | 11/1960 | Collins | 172—198 |
| 2,994,388 | 8/1961 | Ryan | 172—180 X |
| 3,085,634 | 4/1963 | Hotchkiss | 172—180 |
| 3,090,447 | 5/1963 | Hotchkiss | 172—178 |
| 3,090,448 | 5/1963 | Hotchkiss | 172—178 |

FOREIGN PATENTS

| 1,158,698 | 6/1958 | France. |
|---|---|---|

ABRAHAM G. STONE, Primary Examiner.

WILLIAM A. SMITH III, JOE O. BOLT, JR., Examiners.